(12) United States Patent
Mermoud et al.

(10) Patent No.: US 10,680,919 B2
(45) Date of Patent: Jun. 9, 2020

(54) ELIMINATING BAD RANKERS AND DYNAMICALLY RECRUITING RANKERS IN A NETWORK ASSURANCE SYSTEM

(71) Applicant: Cisco Technology, Inc., San Jose, CA (US)

(72) Inventors: Grégory Mermoud, Veyras (CH); Jean-Philippe Vasseur, Saint Martin D'uriage (FR); Abhishek Kumar, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 15/967,668

(22) Filed: May 1, 2018

(65) Prior Publication Data
US 2019/0342194 A1 Nov. 7, 2019

(51) Int. Cl.
*H04L 12/26* (2006.01)
*G06N 20/00* (2019.01)
*H04L 12/24* (2006.01)

(52) U.S. Cl.
CPC ........... *H04L 43/062* (2013.01); *G06N 20/00* (2019.01); *H04L 43/045* (2013.01); *H04L 41/22* (2013.01)

(58) Field of Classification Search
CPC ..... H04L 43/062; H04L 43/045; H04L 41/22; G06N 20/00
See application file for complete search history.

(56) References Cited

U.S. PATENT DOCUMENTS

| 6,757,668 B1 * | 6/2004 | Goebel ............... G06K 9/6292 706/47 |
| 7,526,467 B2 | 4/2009 | Fogel |
| 9,336,268 B1 | 5/2016 | Moudy et al. |

(Continued)

OTHER PUBLICATIONS

Liu, et al., "Anomaly Detection in Feedback-based Reputation Systems through Temporal and Correlation Analysis", 2010 IEEE Second International Conference on Social Computing (SocialCom), 8 pages, 2010, IEEE.

(Continued)

*Primary Examiner* — Michael A Keller
(74) *Attorney, Agent, or Firm* — BEHMKE INNOVATION GROUP LLC; James M. Behmke; Jonathon P. Western

(57) ABSTRACT

In one embodiment, a network assurance service that monitors a network detects anomalies in the network by applying one or more machine learning models to telemetry data from the network. The network assurance service ranks feedback from a plurality of anomaly rankers regarding relevancy or criticality of the detected anomalies. The network assurance service clusters the plurality of anomaly rankers into clusters of similar rankers, based on the received ranking feedback. The network assurance service uses the clusters of similar rankers to assign reliability scores to each of the anomaly rankers. The network assurance service selects, based on the reliability scores, a subset of the plurality of anomaly rankers to receive an anomaly detection alert regarding a particular detected anomaly to be ranked. The network assurance service provides the anomaly detection alert to the selected subset of the plurality of anomaly rankers for ranking.

20 Claims, 9 Drawing Sheets

(56) References Cited

U.S. PATENT DOCUMENTS

| | | | |
|---|---|---|---|
| 2001/0027539 A1* | 10/2001 | Nozuyama | G01R 31/318342 714/33 |
| 2008/0109730 A1* | 5/2008 | Coffman | G06Q 30/02 715/733 |
| 2017/0279830 A1 | 9/2017 | Mermoud et al. | |
| 2018/0239770 A1* | 8/2018 | Ghotbi | G06F 3/0484 |
| 2019/0138938 A1* | 5/2019 | Vasseur | H04L 41/145 |

OTHER PUBLICATIONS

Wang, et al., "Reputation Measurement and Malicious Feedback Rating Prevention in Web Service Recommendation Systems", IEEE Transactions on Services Computing, vol. 8, No. 5, Sep./Oct. 2015, pp. 755-767, 2015, IEEE.

\* cited by examiner

FIG. 6

ELIMINATING BAD RANKERS AND DYNAMICALLY RECRUITING RANKERS IN A NETWORK ASSURANCE SYSTEM

TECHNICAL FIELD

The present disclosure relates generally to computer networks, and, more particularly, to eliminating bad rankers and dynamically recruiting rankers in a network assurance system.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example similarity matrix for anomaly rankers; and

DESCRIPTION OF EXAMPLE EMBODIMENTS

Overview

Figure 1A:
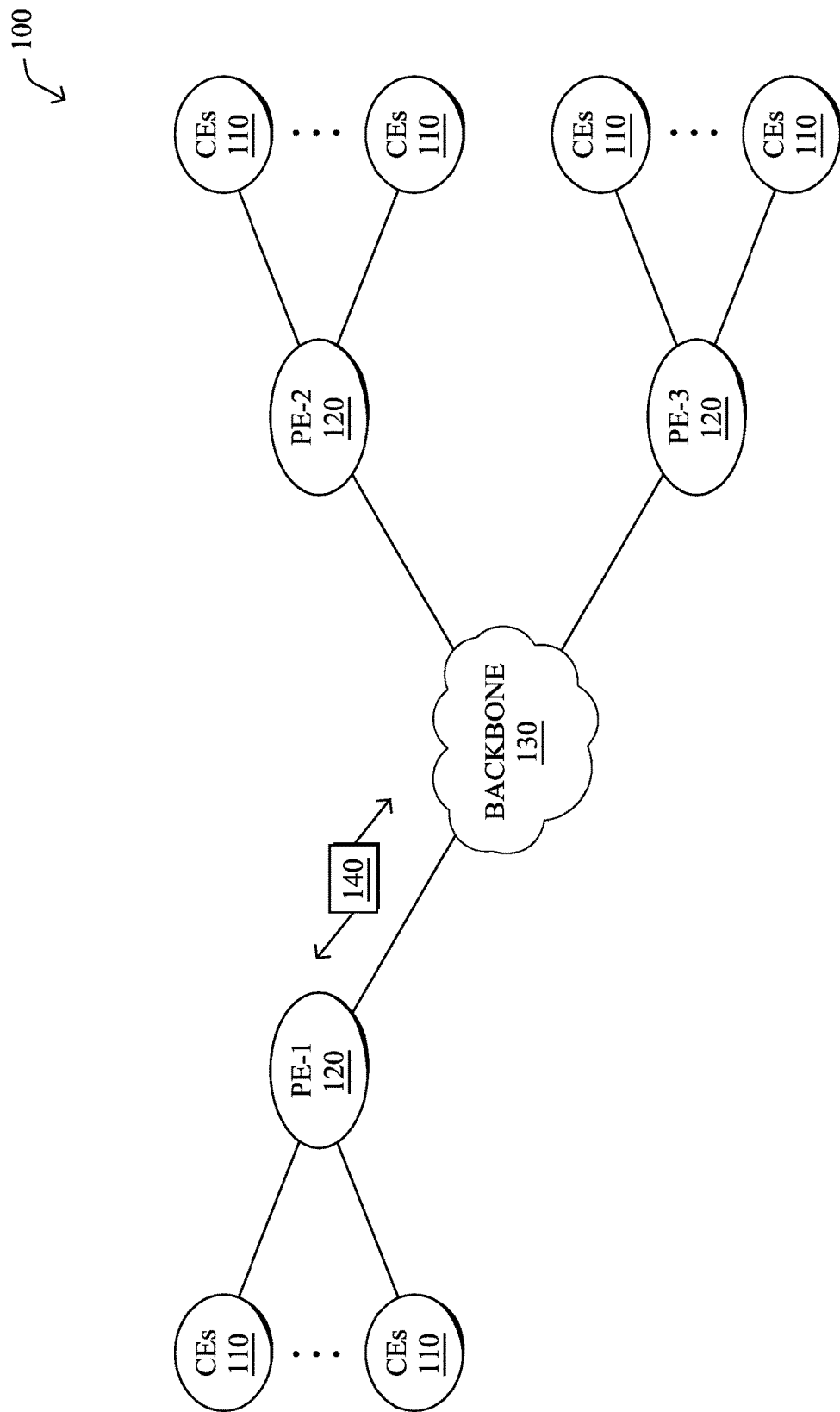
FIGS. 1A-1B illustrate an example communication network.

According to one or more embodiments of the disclosure, a network assurance service that monitors a network detects anomalies in the network by applying one or more machine learning models to telemetry data from the network. The network assurance service ranks feedback from a plurality of anomaly rankers regarding relevancy or criticality of the detected anomalies. The network assurance service clusters the plurality of anomaly rankers into clusters of similar rankers, based on the received ranking feedback. The network assurance service uses the clusters of similar rankers to assign reliability scores to each of the anomaly rankers. The network assurance service selects, based on the reliability scores, a subset of the plurality of anomaly rankers to receive an anomaly detection alert regarding a particular detected anomaly to be ranked. The network assurance service provides the anomaly detection alert to the selected subset of the plurality of anomaly rankers for ranking.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
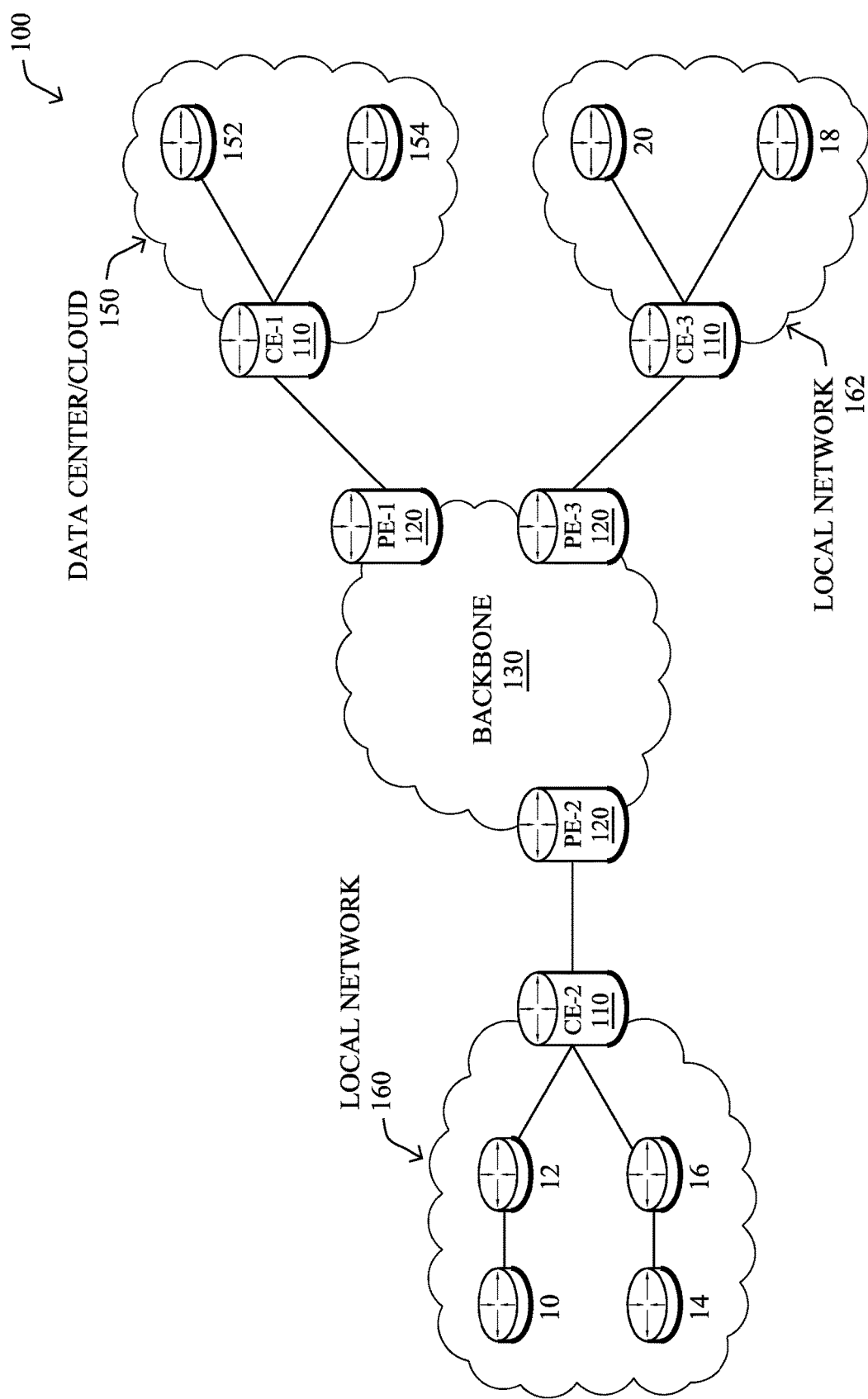

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
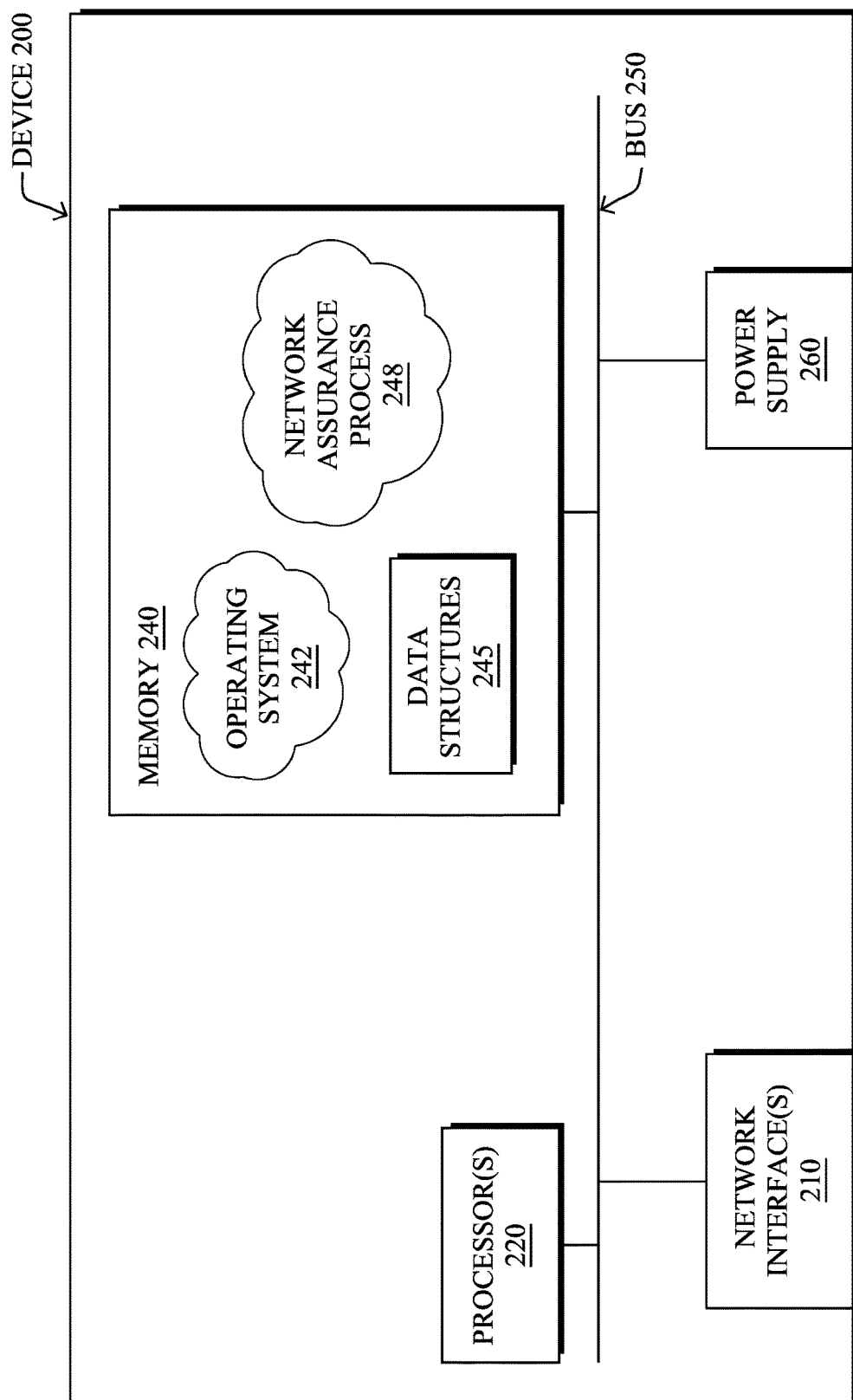
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
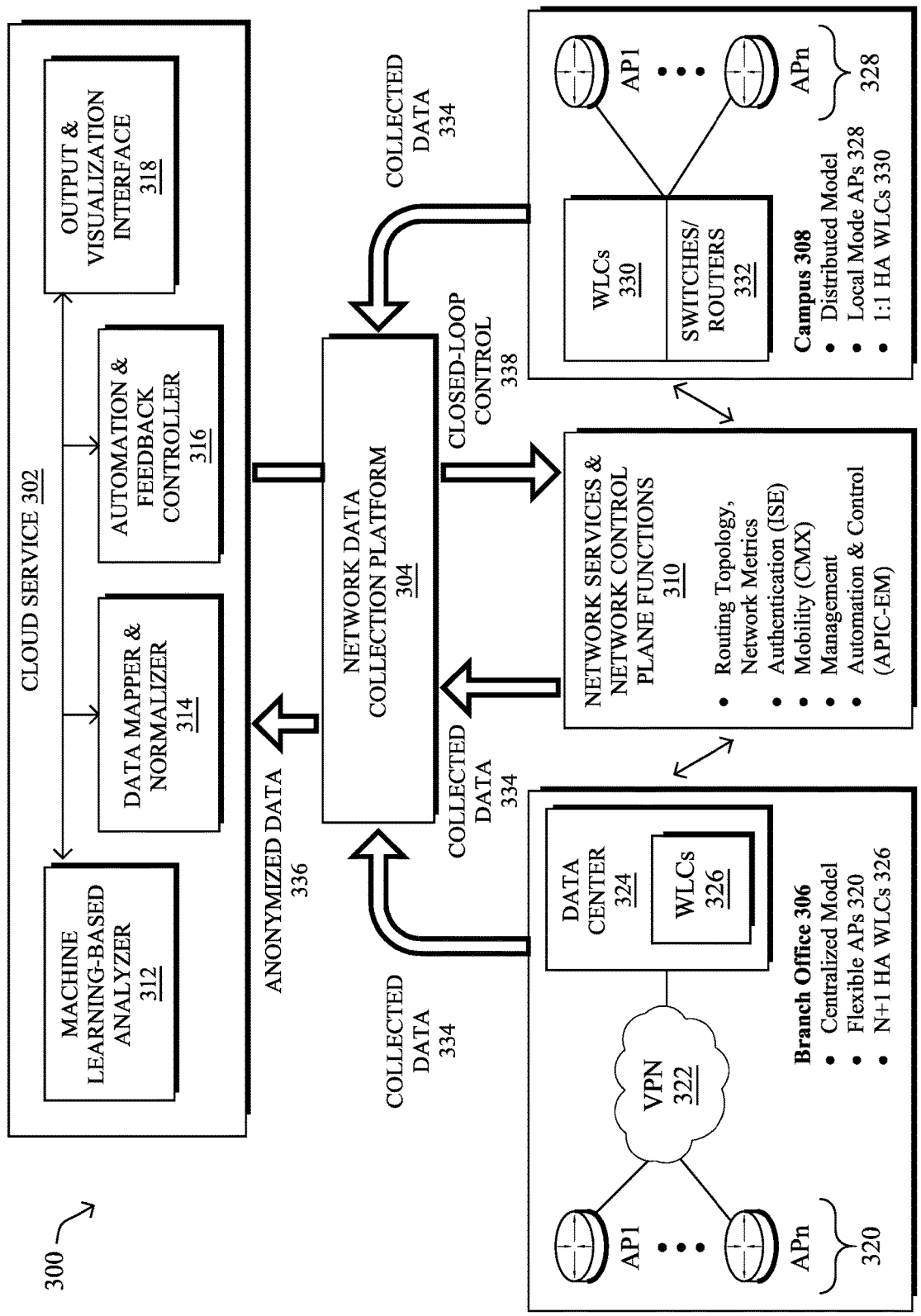
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, machine learning allows a network assurance service to detect network anomalies from the various forms of telemetry data collected from the monitored network. However, the very nature of network anomaly detection involves detecting network behaviors that are different or anomalous, rather than what is relevant or critical with respect to the health of the network. In various embodiments, a network assurance service may provide anomaly detection alerts to a set of users designated as anomaly rankers, to provide feedback regarding the detected network anomalies. In turn, the network assurance system may adjust its internal models and/or reporting mechanism, to prevent the detection or reporting of irrelevant and non-critical network anomalies.

While feedback from anomaly rankers can be quite effective for purposes of adjusting a network anomaly detection model, there is also no guarantee that this feedback is 'good' feedback. Indeed, inaccurate or incorrect feedback from a 'bad' ranker, whether done intentionally or accidentally, can actually cause the anomaly detection model to become biased in a way that harms the usefulness and performance of the model. Thus, the concept of a 'bad' anomaly ranker can be more inclusive than just malicious rankers, but can also encompass experts whose feedback is largely inconsistent with their peers. In either case, the overall quality of the feedback is lowered and potentially impinge on the effectiveness of the anomaly detector.

Eliminating Bad Rankers and Dynamically Recruiting Rankers in a Network Assurance System The techniques herein introduce a set of mechanisms that allow for the identification of 'bad' anomaly rankers that may provide inappropriate, inaccurate, or undesirable feedback to a machine learning-based anomaly detector of a network assurance system. The use of such mechanisms is especially applicable to unsupervised learning systems that rely on user feedback to adjust their internal parameters. In some aspects, the techniques herein can be used to build a database of 'good' and 'bad' rankers and their corresponding rankings on a given set of resources. In further aspects, the techniques herein allow for the identification and recruitment of 'good' rankers, so as to have enough rankings for a set of resources, such as detected network anomalies, to conclusively distinguish between relevant/important anomalies and irrelevant/unimportant anomalies.

Specifically, according to one or more embodiments of the disclosure as described in detail below, a network assurance service that monitors a network detects anomalies in the network by applying one or more machine learning models to telemetry data from the network. The network assurance service ranks feedback from a plurality of anomaly rankers regarding relevancy or criticality of the detected anomalies. The network assurance service clusters the plurality of anomaly rankers into clusters of similar rankers, based on the received ranking feedback. The network assurance service uses the clusters of similar rankers to assign reliability scores to each of the anomaly rankers. The network assurance service selects, based on the reliability scores, a subset of the plurality of anomaly rankers to receive an anomaly detection alert regarding a particular detected anomaly to be ranked. The network assurance service provides the anomaly detection alert to the selected subset of the plurality of anomaly rankers for ranking.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
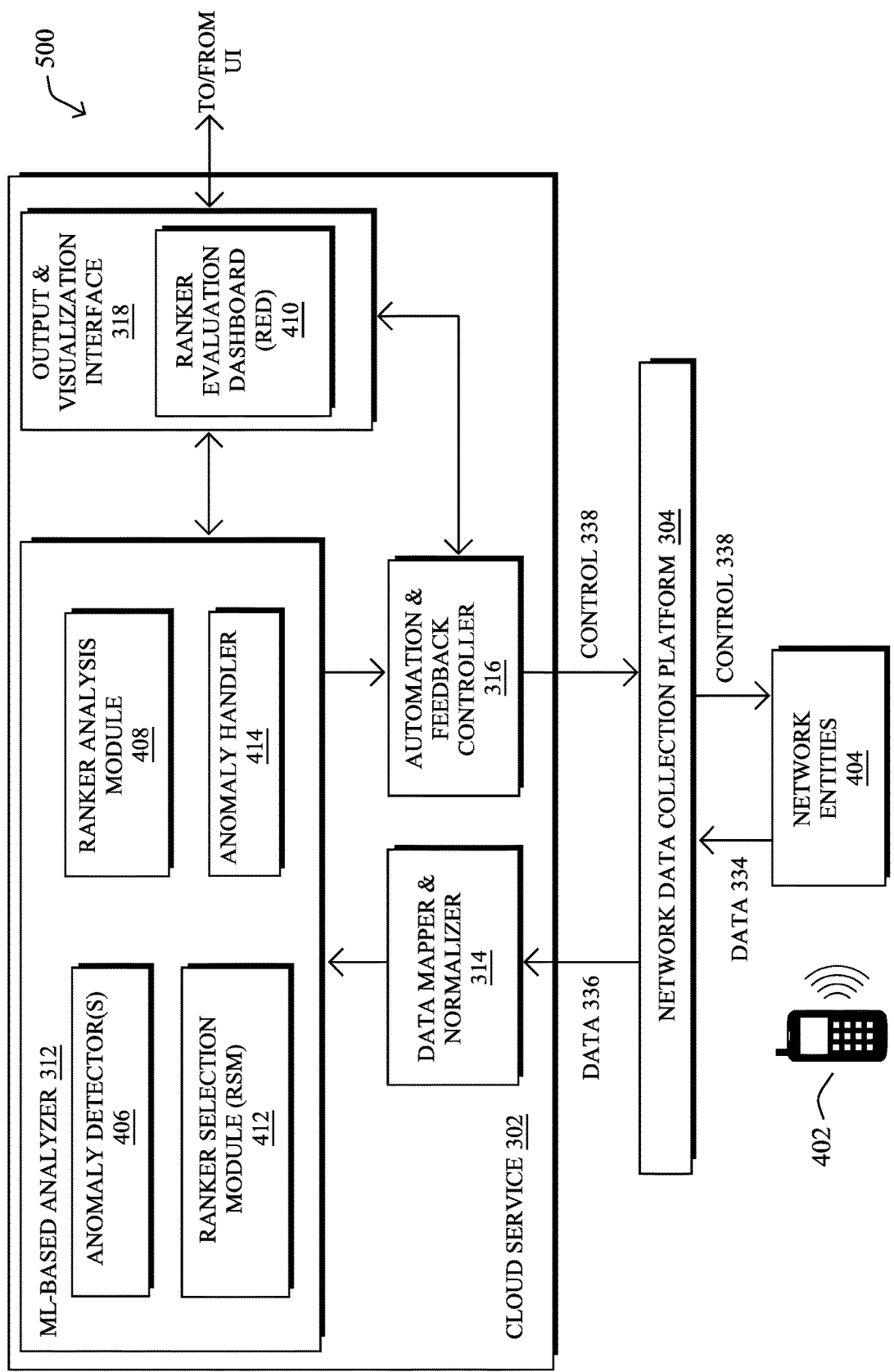
FIG. 4 illustrates an example architecture for eliminating bad rankers and recruiting rankers in a network assurance system.

Operationally, FIG. 4 illustrates an example architecture for eliminating bad rankers and recruiting rankers in a network assurance system, according to various embodiments. At the core of architecture 400 may be the following components: one or more anomaly detectors 406, a ranker analysis module 408, a ranker evaluation dashboard (RED) 410, a ranker selection module (RSM) 412, and/or an anomaly handler 414. In some implementations, the components of architecture 400 may be implemented within a network assurance system, such as system 300 shown in FIG. 3. Accordingly, the components 406-414 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

To illustrate the teachings herein, the following definitions are used:

Feedback—a feedback is a rating given by a given ranker (e.g., identified by a rankerId) for a given resource, such as (e.g., an alert raised by the system, identified by a resourceId). Any scale can be used for the feedback, either on a sliding scale or via discrete values. For example, a feedback can take the values of: '1'=like, '0'=indifferent, and '−1'=dislike.

Ranker—a ranker provides feedback on any number of resources. If multiple feedback was provided on the same resource, only the most recent feedback may be considered, in some implementations.

Resource—a resource is an element (e.g., identified by a resourceID) that can be rated by a ranker via a feedback. An example of a resource is an alert raised by an anomaly detection system. In such a case, rankers may provide feedback for the resource to quantify the relevance and/or criticality of the alert. Resources can also be of different types, in some embodiments. For example, different types of anomalies can be reported to different sets of rankers, to allow only the rankers that are knowledgeable for that anomaly type to provide feedback.

During operation, service 302 may receive telemetry data from the monitored network (e.g., anonymized data 336 and/or data 334) and, in turn, assess the data using one or more anomaly detectors 406. At the core of each anomaly detector 406 may be a corresponding anomaly detection model, such as an unsupervised learning-based model. When an anomaly detector 406 detects a network anomaly, output and visualization interface 318 may send an anomaly detection alert to a user interface (UI) for feedback from any number of anomaly rankers.

As shown, in various embodiments, architecture 400 may also include a ranker analysis module 408 which is responsible for maintaining and analyzing a feedback database. Such a database may track the anomaly feedback received via output and visualization interface 318 regarding the network anomalies detected by anomaly detector(s) 406. For example, assume that N-number of rankers provide feedback on M-number of resources. In such a case, the feedback database may comprise a matrix with N-number of rows (e.g., one per ranker) and M-number of columns (e.g., one per resource).

Figure 5A:
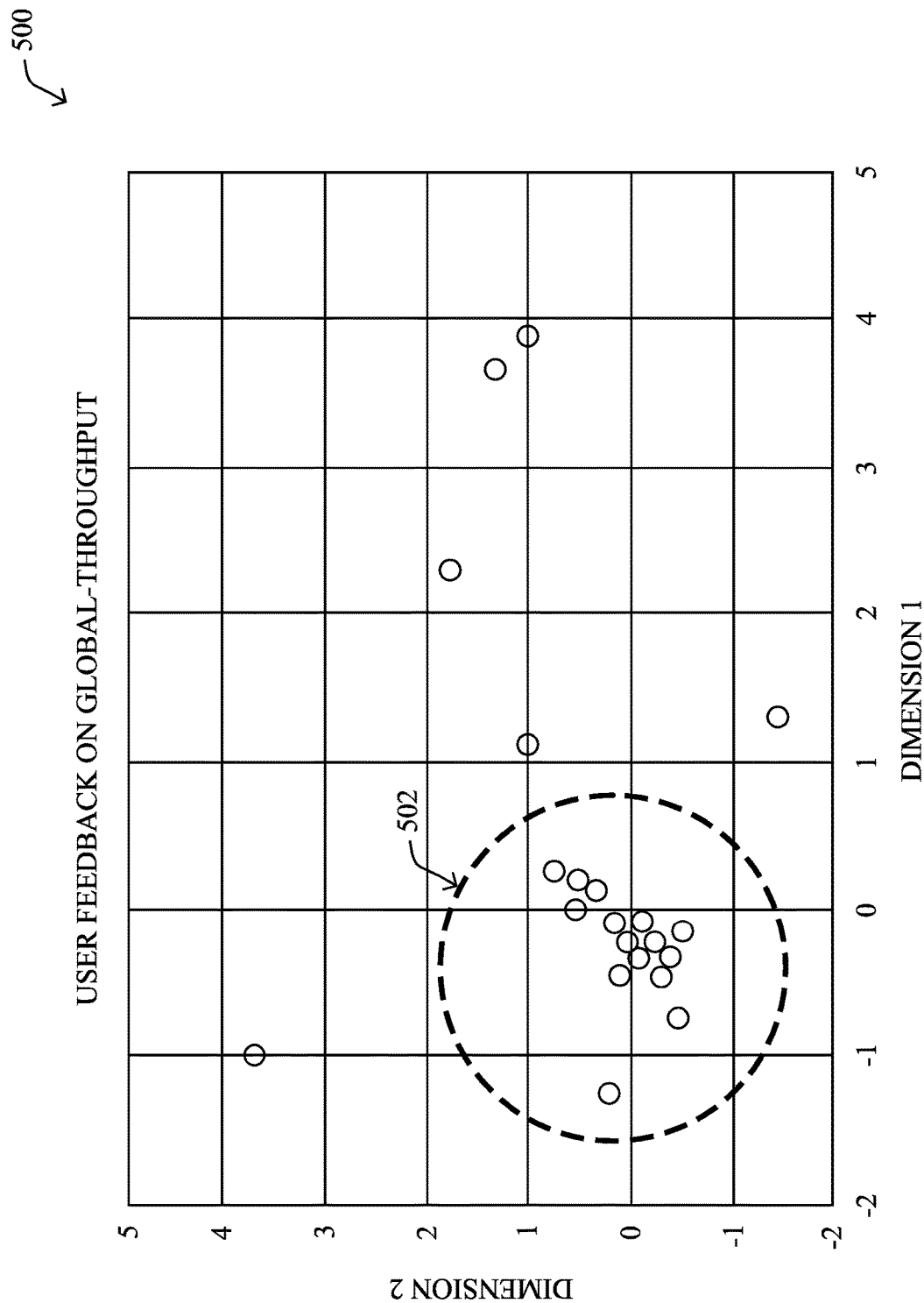
FIGS. 5A-5B illustrate examples of clustering anomaly rankers based on their feedback.
Figure 5B:
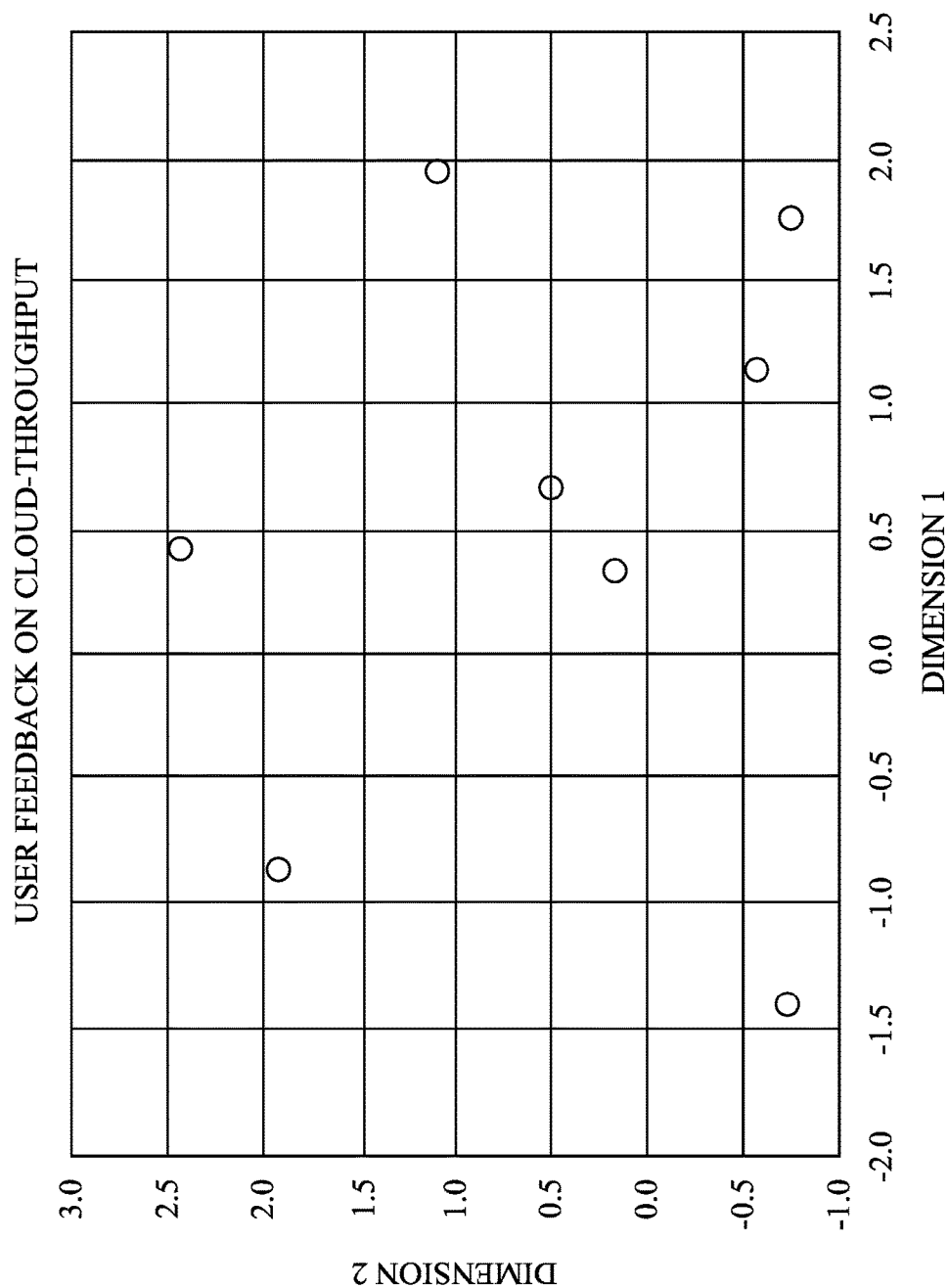

Assuming that the matrix values in the feedback database describe the rating of a given expert, ranker analysis module 408 can use principal component analysis (PCA) or another dimensionality reduction method, to create visualizations of how rankers relate to one another in terms of their feedbacks. FIGS. 5A-5B illustrate examples of clustering anomaly rankers based on their feedback. More specifically, plot 500 in FIG. 5A and plot 510 in FIG. 5B illustrate the results of using PCA on feedback received for global throughput and cloud throughput. By assessing the first two principal components, which split the data along the directions of maximum variance, a prominent cluster 502 of rankers can be seen that gave similar rankings for global throughput-related anomalies, but no such cluster exists in plot 510. In particular, by using PCA or another dimensionality reduction method, anomaly rankers that appear close to one another in a cluster provided "similar" feedback, whereas rankers that do not appear in the cluster are outliers.

Several insights can be made from plots 500 and 510 in FIGS. 5A-5B. First, cluster 502 of anomaly rankers in plot 500 does not appear in plot 510. This means that the rankers in cluster 502 ranked global throughput anomalies similarly, but there was less of a consensus with respect to cloud throughput anomalies. Second, as there is not a guarantee of a ranker cluster appearing for any given type of anomaly, this means that the rankers may have different degrees of reliability. This variability is likely due to the rankers each having his, or her, own domains of expertise. Third, there are some rankers that do not appear in a cluster in either of plots 500 or plot 510, indicating that some rankers are generally less reliable and their influence on the system can be reduce or even stopped.

Referring again to FIG. 4, ranker analysis module 408 may perform the above cluster analysis for all rankers, to see whether a given ranker is consistently an outlier or only for a given use case/anomaly type. In addition to PCA, another dimensionality reducing technique that ranker analysis module 408 may use is t-distributed stochastic neighbor embedding (t-SNE) that can maintain local structure while dimensionally reducing the data. In further embodiments, ranker analysis module 408 may utilize a technique to deal with categorical data, like the rankings discussed herein, such as Multiple Correspondence Analysis. Each approach may be suited to a particular objective, but in this case, the results would be comparable.

In turn, ranker analysis module 408 can use metrics such as the Local Outlier Factor (LOF) of each ranker to decide whether that ranker should be excluded from receiving anomaly detection alerts for a certain anomaly type or all anomaly types.

In various embodiments, ranker analysis module 408 may calculate another metric: the agreement score of each ranker. In general, ranker analysis module 408 can compute this metric for each pair of rankers as the proportion of resources that they ranked similarly. Of course, if a pair of rankers never ranked the same resource, this metric cannot be computed, thus leading to a sparse N×N matrix. In such cases, ranker analysis module 408 can use this sparse matrix to perform co-clustering and identify groups of rankers that agree with each other, and, by extension, potential outliers that agree with very few people.

Figure 6:
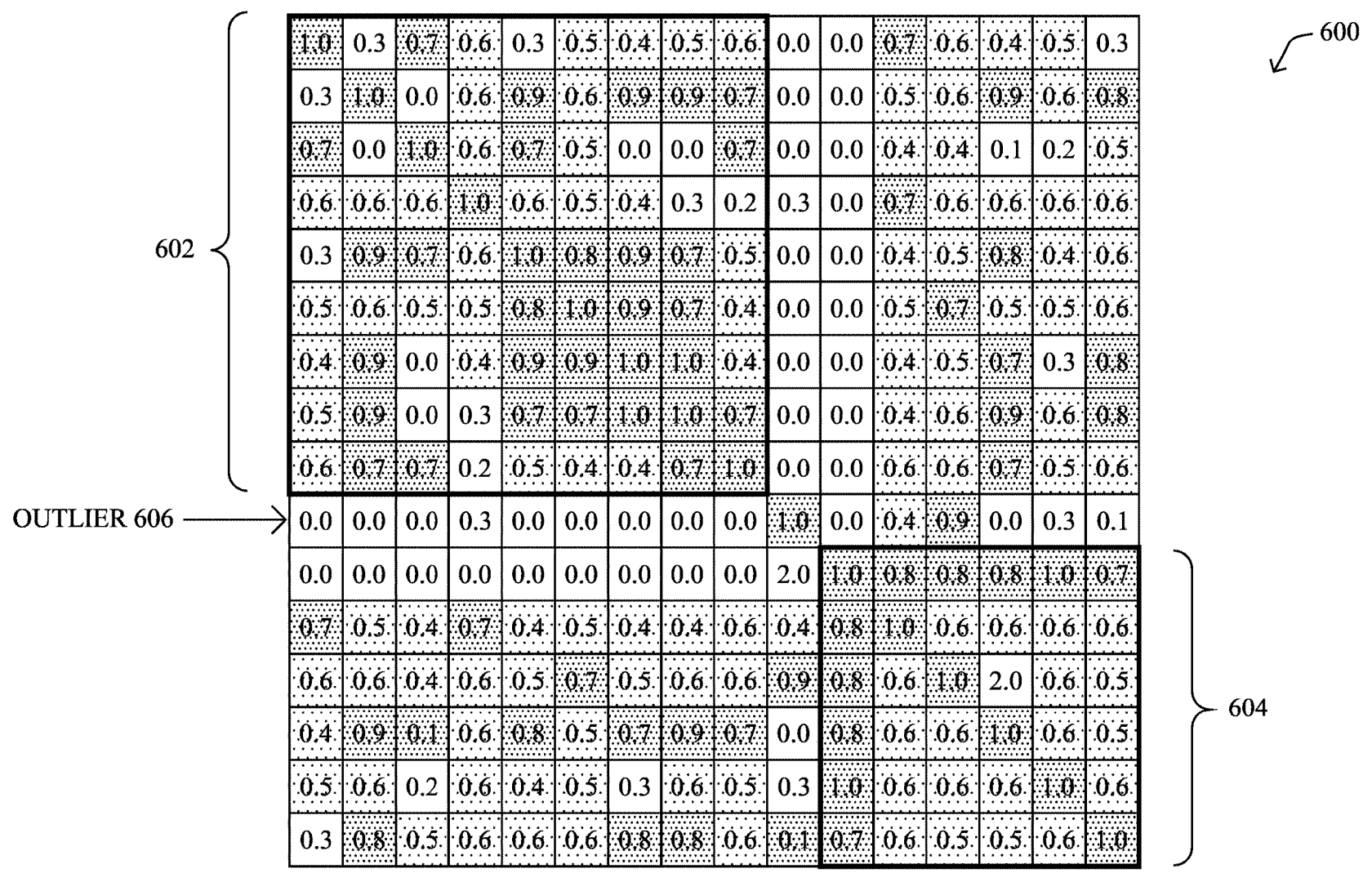

FIG. 6 illustrates an example similarity matrix 600 for sixteen different anomaly rankers, in various embodiments. As shown, each entry in matrix 600 corresponds to a computed agreement score between a pair of the rankers ranging from 0-1 (e.g., no agreement to perfect agreement). Each ranker, by definition, agrees exactly with itself, hence the diagonal in matrix 600 of '1s'. From matrix 600, two clusters, cluster 602 and cluster 604, can clearly be seen. In addition, a single outlier 606 can also be seen, that does not belong to either of clusters 602-604.

Referring again to FIG. 4, ranker analysis module 408 may use any of the various techniques described above to provide a reliability score to each ranker, potentially conditioned on the type of resource. For example, the reliability score for a ranker may be based on whether the ranker belongs to a cluster of rankers that provided similar feedback, the agreement scores associated with the ranker, combinations thereof, or based on other such factors. Any of the above techniques can also be used only for a given type of resource, in some embodiments. This is important because a given ranker may be knowledgeable only in a certain area, thus making his or her feedback appropriate in some cases, and inappropriate in others.

In various embodiments, architecture 400 may also include a ranker evaluation dashboard (RED) 410 that uses the reliability scores produced by ranker analysis module 408 to generate a report for the system administrator. For example, RED 410 may be a component of output and visualization interface 318 that provides display data to a UI. In particular, RED 410 may provide visualizations of the different clusters of rankers, and indicate those rankers that are considered as outliers. RED 410 allows the administrator to manually select and exclude rankers that he or she deems unreliable, along with an optional explanation to them.

In another embodiment, RED 410 is available to the rankers themselves and makes use of differential privacy techniques to avoid disclosing the identity of other rankers. In particular, the exact position and ratings of other rankers is never disclosed to anyone, but are instead summarized by RED 410 using distributions and/or statistics that are noised in a way that ensure the confidentiality of the underlying data.

Another component of architecture 400 may be ranker selection module (RSM) 412, in various embodiments. For example, RSM 412 may be implemented as a component of machine learning-based analyzer 312 or as its own component. During operation, RSM 412 may function as a fully automated closed-loop control system. Notably, RSM 412 relies on the reliability scores from ranker analysis module 408 to decide automatically which rankers to exclude from the feedback database, and potentially blacklist from receiving anomaly detection alerts altogether. RSM 412 may also automatically notify the system administrator and/or the excluded ranker, along with an explanation for the blacklisting.

In some embodiments, RSM 412 may use anomaly detection techniques to estimate what is an acceptable level of reliability for a given type of resources. The sensitivity of RSM 412 may be adjusted by the system administrator depending on the criticality of the type of resources. For instance, RSM 412 may be very strict regarding the ranking of publicly exposed resources that may hurt the sensitivity of the general public (e.g., images, blog posts), as a few rankers attempting to manipulate the system may lead to the selection of inappropriate content. In the context of network issues/alerts, RSM 412 may be more permissive and even perform some active exploration, in order to better understand the expertise of each ranker.

In another embodiment, RSM 412 may be used to identify a ranker having a very different opinion than other rankers, for purposes of exploration. Indeed, exploration can sometimes be performed to find unusual patterns. For example, if a ranker provide a very different ranking for a resource, there may be a good reason that is worth investigating. This is particularly true if the ranker ranked the resource positively (e.g., rated an alert as critical or relevant), especially if the resource is ranked positively in contrast with other rankers. Preliminary testing has shown that some ranker provides a good explanation about a detected anomaly for which other rankers did not have any good explanation.

A further component of architecture 400 may be anomaly handler 414 that uses the output of the 410 to process an anomaly detected by an anomaly detector 406. As noted, one of the major challenges in implementing a network assurance system that uses anomaly detection lies in the decision to show or suppress a given anomaly. Since anomaly detector(s) 406 may use unsupervised learning, there is a lack of an explicit label of what is a good/relevant anomaly versus what is bad/irrelevant. One way of assessing the performance of such a system, and thus improving the model(s) of anomaly detector(s) 406 is to evaluate the percentage of agreement between rankers (e.g., based on their agreement scores), in order to flag such anomalies as good/critical/relevant and, conversely, find anomalies for which there is a strong agreement that such anomalies are bad/irrelevant.

When the agreement score for a given anomaly alert is too low (e.g., below 0.6 or another threshold), then the anomaly feedback is inconclusive. Thus, in some embodiments, anomaly handler 414 may be configured to recruit dynamically new rankers when the feedback from the first set of selected rankers for the anomaly is not conclusive. Notably, testing has revealed that the number of rankers is often much lower than the number of anomalies, leading to poor overlap of ranking. Consequently, it is not rare for some anomalies to be ranked by two or three rankers, leading to a higher probability of poor agreement. Thus, anomaly handler 414 automatically determines the set of anomalies (resources) for which the agreement score is too low and explicitly requests a second set of other rankers to rank the anomaly. Additionally, anomaly handler 414 may maintain a database of "good" rankers for each resource type, so as to explicitly request a ranking for a resource (e.g., anomaly) that does not have a good enough agreement score. This allows the network assurance system to dynamically recruit anomaly rankers that have good reputations among the rankers (e.g., are in agreement with the others).

Figure 7:
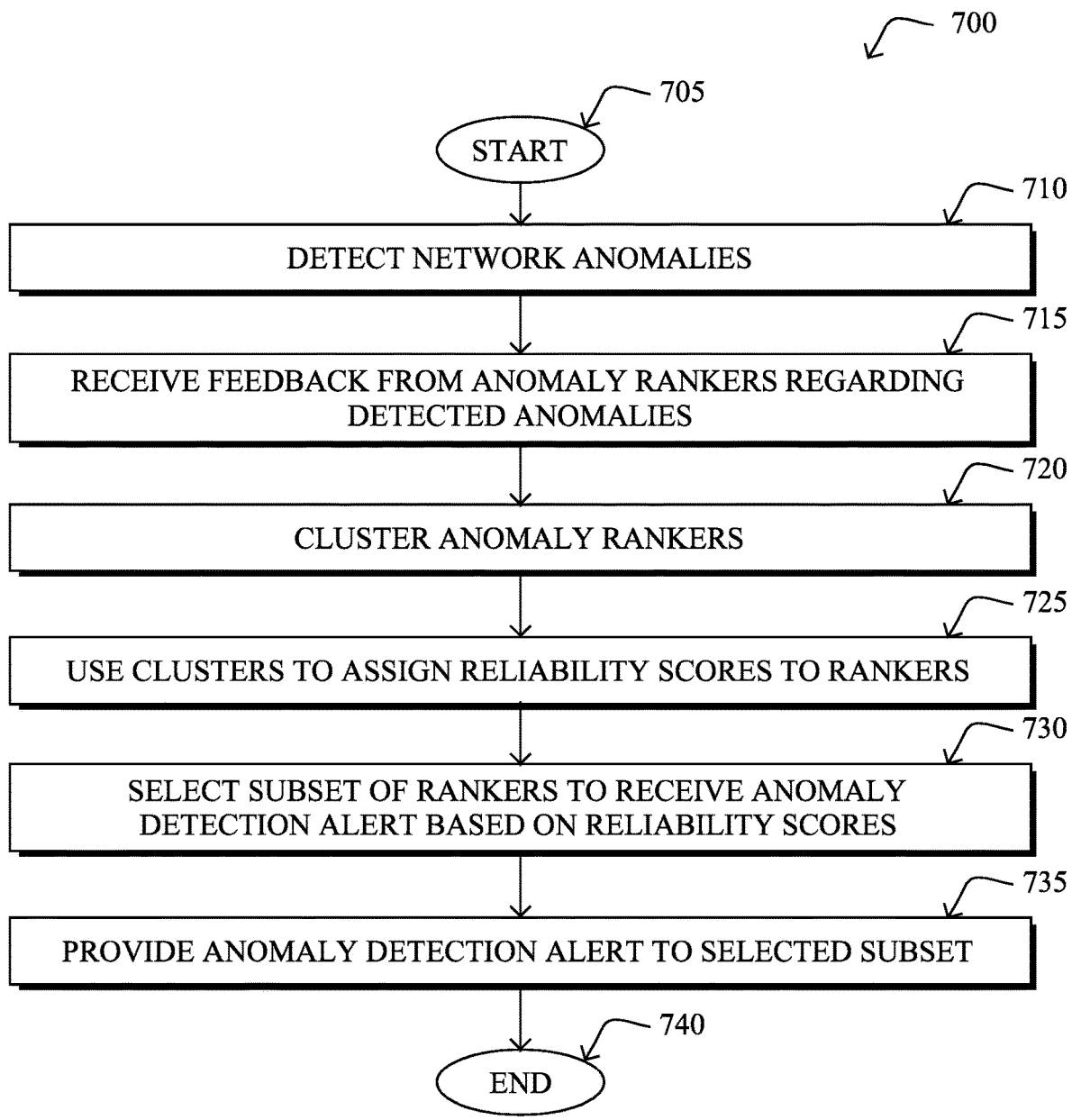
FIG. 7 illustrates an example simplified procedure for eliminating bad rankers in a network assurance system.

FIG. 7 illustrates an example simplified procedure for eliminating bad rankers in a network assurance system, in accordance with one or more embodiments described herein. For example, a non-generic, specifically configured device (e.g., device 200) may perform procedure 700 by executing stored instructions (e.g., process 248), to implement a network assurance service that monitors a network. The procedure 700 may start at step 705, and continues to step 710, where, as described in greater detail above, the network assurance service may detect anomalies in the network by applying one or more machine learning models to telemetry data from the network. For example, the network assurance service may detect traffic anomalies (e.g., throughput anomalies, etc.), wireless roaming anomalies (e.g., a high number of client roams, etc.), onboarding anomalies (e.g., authentication anomalies, failures to attach to a wireless AP, etc.), or any other form of network anomaly.

At step 715, as detailed above, the network assurance service may receive ranking feedback from a plurality of anomaly rankers regarding relevancy or criticality of the detected anomalies. Notably, not every detected anomaly may be of importance or deemed critical but simply may be "different" from the behaviors previously observed in the monitored network. In order to update the anomaly detection model(s) and/or prevent the reporting of irrelevant anomalies, the network assurance service may report the anomaly detection alerts to a group of anomaly rankers that label the anomalies according to their relevancy or criticality.

At step 720, the network assurance service may cluster the plurality of anomaly rankers into clusters of similar rankers, based on the received ranking feedback, as described in greater detail above. For example, a certain cluster of rankers may agree with one another 80% of the time with respect to the relevancy or criticality of the anomaly detection alerts ranked by the cluster members. Conversely, by clustering rankers with similar feedback, the service can also identify outliers that do not belong to any cluster. Such outliers can be used, in some cases, to seek out explanations from the outliers as to the reasons for their rankings.

At step 725, as detailed above, the network assurance service may use the clusters of similar rankers to assign reliability scores to each of the anomaly rankers. In particular, a ranking provided by a ranker that is often in agreement with other rankers is likely to be of greater value to the system for purposes of model retaining and/or suppressing certain anomaly alerts. In various embodiments, the service may calculate a reliability score for a given ranker based on whether the ranker belongs to a cluster of similar rankers, the characteristics of that cluster (e.g., the size of the cluster, the number of anomalies reviewed by the cluster members, etc.), the similarity scores between the ranker and other rankers, and/or any other relevant information (e.g., the specific role of the ranker in the organization, etc.).

At step 730, the network assurance service may select, based on the reliability scores, a subset of the plurality of anomaly rankers to receive an anomaly detection alert regarding a particular detected anomaly to be ranked, as described in greater detail above. For example, the service may send the anomaly detection alert only to the top n-number of rankers, based on their reliability scores. In doing so, 'bad' rankers may be excluded from being able to label the particular anomaly. In other embodiments, the service may still elicit feedback from the 'bad' rankers, but may still exclude their feedback from affecting the anomaly detection model(s) or anomaly alert filter. In further embodiments, the set of rankers may be selected based in part on the type of the particular anomaly. For example, some rankers may have high reliability scores for a certain type of anomaly and low reliability scores for other types of anomalies.

At step 735, as detailed above, the network assurance service may provide the anomaly detection alert to the selected subset of the plurality of anomaly rankers for ranking. As noted, the service can then use such feedback from the selected rankers for purposes of adjusting its anomaly detection model, creating or adjusting an alert filter (e.g., to suppress anomaly alerts for irrelevant anomalies), or other functions. In some cases, the feedback from the selected rankers may not reach a consensus. In such cases, the service may also dynamically select another set of rankers and seek their feedback on the particular anomaly, as well. Procedure 700 then ends at step 740.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a network assurance service to leverage unsupervised anomaly detection with feedback for purposes of detecting network anomalies in a monitored network. In particular, feedback from anomaly rankers may indicate to the service whether a reported anomaly is relevant or critical, thus allowing the system to make automatic adjustments to prevent the reporting of irrelevant or otherwise benign anomalies. In some aspects, the techniques herein enable the service to intelligently select anomaly rankers that are considered reliable. Doing so helps to exclude malicious, unreliable, or other 'bad' rankers from weighing in on the relevancy or criticality of anomalies detected by the service.

While there have been shown and described illustrative embodiments that provide for eliminating bad rankers and dynamically recruiting rankers in a network assurance system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    detecting, by a network assurance service that monitors a network, anomalies in the network by applying one or more machine learning models to telemetry data from the network;
    receiving, at the network assurance service, ranking feedback from a plurality of anomaly rankers regarding relevancy or criticality of the detected anomalies;
    clustering, by the network assurance service, the plurality of anomaly rankers into clusters of similar rankers, based on the received ranking feedback, wherein the cluster of similar rankers are rankers that agree with each other a certain percentage of the time;
    using, by the network assurance service, the clusters of similar rankers to assign reliability scores to each of the anomaly rankers;
    selecting, by the network assurance service and based on the reliability scores, a subset of the plurality of anomaly rankers to receive an anomaly detection alert regarding a particular detected anomaly to be ranked; and
    providing, by the network assurance service, the anomaly detection alert to the selected subset of the plurality of anomaly rankers for ranking.

2. The method as in claim 1, further comprising:
    adjusting, by the network assurance service, at least one of the one or more machine learning models based on the received feedback.

3. The method as in claim 1, further comprising:
    providing, by the network assurance service, one or more visualizations of the clusters of similar rankers to a user interface; and
    receiving, at the network assurance service, a selection of one or more of the plurality of anomaly rankers from the user interface, wherein the network assurance service selects the subset of the plurality of anomaly rankers to receive the anomaly detection alert based in part on the received selection.

4. The method as in claim 3, wherein providing the one or more visualizations of the clusters of similar rankers to the user interface comprises:
    forming the one or more visualizations of the clusters by performing dimensionality reduction on a matrix of anomaly rankers and resources for which the rankers provided feedback, wherein a particular resource corresponds to a particular type of network anomaly.

5. The method as in claim 1, further comprising:
    receiving, at the network assurance service, ranking feedback from the subset of anomaly rankers regarding the particular detected anomaly; and
    calculating, by the network assurance service, agreement scores between the selected subset of the plurality of anomaly rankers.

6. The method as in claim 5, wherein the subset of the first plurality of anomaly rankers is a first subset, and wherein the method further comprising:
    determining, by the network assurance service and based on the calculated agreement scores, that a threshold agreement was not reached by the first subset of the plurality of anomaly rankers regarding the particular detected anomaly; and
    selecting, by the network assurance service, a second subset of the plurality of anomaly rankers to receive the anomaly detection alert regarding the particular detected anomaly, when a threshold agreement was not reached by the first subset of the plurality of anomaly rankers.

7. The method as in claim 5, further comprising:
    identifying, by the network assurance service, one of the subset of anomaly rankers as an outlier in the subset, based on the calculated agreement scores; and
    providing, by the network assurance service, data regarding the identified anomaly ranker to a user interface.

8. The method as in claim 1, further comprising:
    associating, by the network assurance service, the particular detected anomaly with an anomaly type, wherein the subset of the plurality of anomaly rankers is selected based in part on the anomaly type associated with the particular detected anomaly.

9. The method as in claim 1, further comprising:
    blacklisting, by the network assurance service, one of the anomaly rankers from receiving anomaly detection alerts, based on the reliability score of the blacklisted ranker.

10. An apparatus, comprising:
    one or more network interfaces to communicate with a network;
    a processor coupled to the network interfaces and configured to execute one or more processes; and
    a memory configured to store a process executable by the processor, the process when executed configured to:
        detect anomalies in the network by applying one or more machine learning models to telemetry data from the network;
        receive ranking feedback from a plurality of anomaly rankers regarding relevancy or criticality of the detected anomalies;
        cluster the plurality of anomaly rankers into clusters of similar rankers, based on the received ranking feedback, wherein the cluster of similar rankers are rankers that agree with each other a certain percentage of the time;
        use the clusters of similar rankers to assign reliability scores to each of the anomaly rankers;
        select, based on the reliability scores, a subset of the plurality of anomaly rankers to receive an anomaly detection alert regarding a particular detected anomaly to be ranked; and
        provide the anomaly detection alert to the selected subset of the plurality of anomaly rankers for ranking.

11. The apparatus as in claim 10, wherein the process when executed is further configured to:
    adjust at least one of the one or more machine learning models based on the received feedback.

12. The apparatus as in claim 10, wherein the process when executed is further configured to:

provide one or more visualizations of the clusters of similar rankers to a user interface; and receive a selection of one or more of the plurality of anomaly rankers from the user interface, wherein the apparatus selects the subset of the plurality of anomaly rankers to receive the anomaly detection alert based in part on the received selection.

13. The apparatus as in claim 12, wherein the apparatus provides the one or more visualizations of the clusters of similar rankers to the user interface by:

forming the one or more visualizations of the clusters by performing dimensionality reduction on a matrix of anomaly rankers and resources for which the rankers provided feedback, wherein a particular resource corresponds to a particular type of network anomaly.

14. The apparatus as in claim 10, wherein the process when executed is further configured to:

receive feedback from the subset of anomaly rankers regarding the particular detected anomaly; and calculate agreement scores between the selected subset of the plurality of anomaly rankers.

15. The apparatus as in claim 14, wherein the subset of the first plurality of anomaly rankers is a first subset, and wherein the process when executed is further configured to:

determine, based on the calculated agreement scores, that a threshold agreement was not reached by the first subset of the plurality of anomaly rankers regarding the particular detected anomaly; and select a second subset of the plurality of anomaly rankers to receive the anomaly detection alert regarding the particular detected anomaly, when a threshold agreement was not reached by the first subset of the plurality of anomaly rankers.

16. The apparatus as in claim 15, wherein the process when executed is further configured to:

identify one of the subset of anomaly rankers as an outlier in the subset, based on the calculated agreement scores; and provide data regarding the identified anomaly ranker to a user interface.

17. The apparatus as in claim 10, wherein the process when executed is further configured to:

associate the particular detected anomaly with an anomaly type, wherein the subset of the plurality of anomaly rankers is selected based in part on the anomaly type associated with the particular detected anomaly.

18. The apparatus as in claim 10, wherein the process when executed is further configured to:

blacklist one of the anomaly rankers from receiving anomaly detection alerts, based on the reliability score of the blacklisted ranker.

19. A tangible, non-transitory, computer-readable medium storing program instructions that cause a network assurance service that monitors a network to execute a process comprising:

detecting, by the network assurance service, anomalies in the network by applying one or more machine learning models to telemetry data from the network;

receiving, at the network assurance service, ranking feedback from a plurality of anomaly rankers regarding relevancy or criticality of the detected anomalies;

clustering, by the network assurance service, the plurality of anomaly rankers into clusters of similar rankers, based on the received ranking feedback, wherein the cluster of similar rankers are rankers that agree with each other a certain percentage of the time;

using, by the network assurance service, the clusters of similar rankers to assign reliability scores to each of the anomaly rankers;

selecting, by the network assurance service and based on the reliability scores, a subset of the plurality of anomaly rankers to receive an anomaly detection alert regarding a particular detected anomaly to be ranked; and providing, by the network assurance service, the anomaly detection alert to the selected subset of the plurality of anomaly rankers for ranking.

20. The computer-readable medium as in claim 19, wherein the process further comprises:

adjusting, by the network assurance service, at least one of the one or more machine learning models based on the received feedback.

* * * * *